(12) United States Patent
Toennesen et al.

(10) Patent No.: US 7,012,561 B2
(45) Date of Patent: Mar. 14, 2006

(54) DEVICE AND METHOD FOR REGISTERING, DETECTING, AND/OR ANALYZING AT LEAST ONE OBJECT

(75) Inventors: Tore Toennesen, Reutlingen (DE); Martin Reiche, Bietigheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/978,132

(22) Filed: Oct. 29, 2004

(65) Prior Publication Data
US 2005/0116855 A1    Jun. 2, 2005

(30) Foreign Application Priority Data
Oct. 29, 2003    (DE) ................ 103 50 553

(51) Int. Cl.
*G01S 13/18* (2006.01)
(52) U.S. Cl. ................ 342/70; 342/994; 342/130; 342/134; 342/135; 342/136; 342/194; 342/196
(58) Field of Classification Search ............ 342/70–72, 342/94–96, 130–136, 194–195
See application file for complete search history.

(56) References Cited

U.S. PATENT DOCUMENTS

| | | | | |
|---|---|---|---|---|
| 4,430,655 A | * | 2/1984 | Rittenbach | 342/155 |
| 5,075,863 A | * | 12/1991 | Nagamune et al. | 702/159 |
| 5,270,780 A | | 12/1993 | Moran et al. | |
| 6,067,040 A | | 5/2000 | Puglia | |
| 6,426,716 B1 | * | 7/2002 | McEwan | 342/28 |
| 6,587,072 B1 | | 7/2003 | Gresham et al. | |
| 6,639,543 B1 | * | 10/2003 | Puglia | 342/70 |
| 6,720,908 B1 | * | 4/2004 | Puglia | 342/70 |

(Continued)

FOREIGN PATENT DOCUMENTS

DE    42 42 700    6/1994

(Continued)

OTHER PUBLICATIONS

"Selection of range and azimuth angle parameters for a forward looking collision warning radar sensor", Kenue, S.K. Intelligent Vehicles '95 Symposium., Proceedings of the Sep. 25-26, 1995 pp. (s):494 - 499.*

(Continued)

*Primary Examiner*—John B. Sotomayor
(74) *Attorney, Agent, or Firm*—Kenyon & Kenyon

(57) ABSTRACT

In order to refine a device and a method for registering, detecting, and/or analyzing at least one object, a registration range and/or at a detection gate being displaced at a scanning speed over a measuring range, in such a way that a target-unique velocity measurement is ensured in continuous detection operation with low latency time and resistance to fluctuations, it is provided that, the receive circuit be divided into at least two channels, which are operable separately from one another, in particular using at least one power divider unit connected downstream from the output terminal of the I/Q mixing unit, of which the first channel of the receive circuit is designed for the purpose of displacing the registration range and/or the detection gate at a constant scanning speed over the entire measuring range, and the second channel of the receive circuit is designed for the purpose of displacing the registration range and/or the detection gate at a variable, in particular reducible scanning speed over the measuring range and/or setting the registration range and/or the detection gate at a predefinable position within the measuring range for a predefinable period of time at a negligible scanning speed.

11 Claims, 1 Drawing Sheet

U.S. PATENT DOCUMENTS

| | | | |
|---|---|---|---|
| 6,879,281 B1 * | 4/2005 | Gresham et al. | 342/70 |
| 6,911,934 B1 * | 6/2005 | Henftling et al. | 342/28 |
| 6,930,631 B1 * | 8/2005 | Puglia | 342/70 |
| 2005/0184903 A1 * | 8/2005 | Isaj | 342/70 |

FOREIGN PATENT DOCUMENTS

| | | |
|---|---|---|
| DE | 44 42 189 | 5/1996 |
| DE | 196 16 038 | 10/1997 |
| DE | 196 22 777 | 12/1997 |
| DE | 199 26 787 | 1/2001 |
| DE | 199 49 409 | 4/2001 |
| DE | 199 63 005 | 6/2001 |
| DE | 100 11 263 | 9/2001 |
| DE | 101 42 170 | 3/2003 |

OTHER PUBLICATIONS

"Spread spectrum ranging for an ACC-radar", Dellefsen, J.; Schmidhammer, E.; Troll, T. Spread Spectrum Techniques and Applications, 1998. Proceedings., 1998 IEEE 5th International Symposium on Vol. 3, Sep. 2-4, 1998 Ps 994-998.*

* cited by examiner

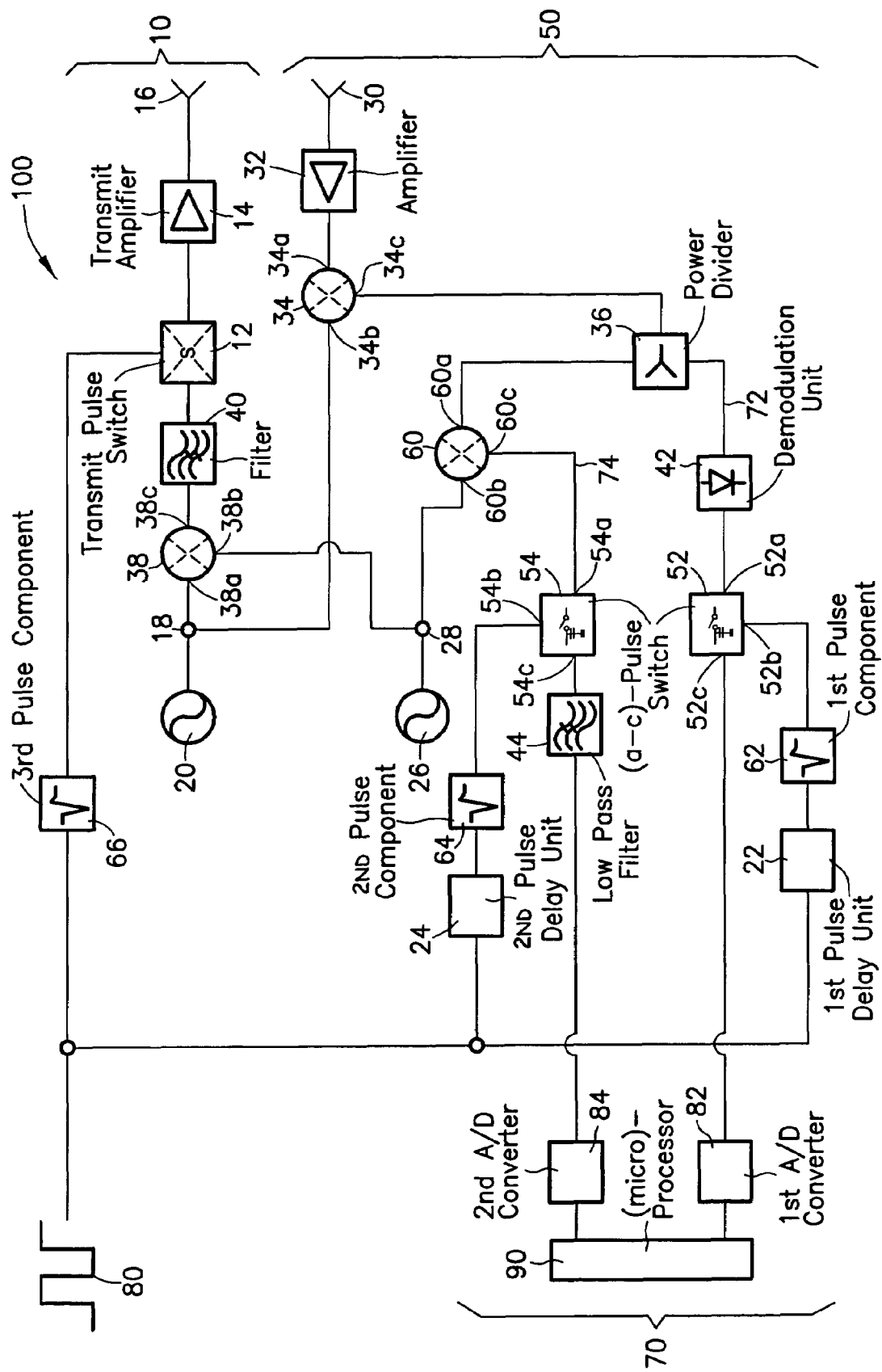

DEVICE AND METHOD FOR REGISTERING, DETECTING, AND/OR ANALYZING AT LEAST ONE OBJECT

FIELD OF THE INVENTION

The present invention relates to a device, in particular a pulse radar device, for registering, detecting, and/or analyzing at least one object, in which a registration range and/or a detection gate is displaceable at a scanning speed over a measuring range.

Furthermore, the present invention relates to a method for registering, detecting, and/or analyzing at least one object, in which a registration range and/or a detection gate may be displaced at a scanning speed over a measuring range.

BACKGROUND INFORMATION

Sensing the surroundings of a conveyance means, in particular a motor vehicle, may be performed in principle using lidar (=light detecting and ranging), radar (=radio detecting and ranging), video, or ultrasound.

Thus, an object detection system having microwave radar sensors is known from German Published Patent Application No. 42 42 700, through which the detection of objects, even those traveling ahead of a vehicle at a great distance, is made possible. This radar sensor contributes to a vehicle safety system, in which information is continuously processed about the distance and the velocity of the vehicle in relation to the vehicles traveling ahead in a predefined angular range.

German Published Patent Application No. 44 42 189 discloses that in a system for distance measurement in the surroundings of motor vehicles, sensors having transmitting units and receiving units may be used for both transmitting and receiving information.

With the aid of range rating, according to German Published Patent Application No. 44 42 189, passive protective measures may be activated for the motor vehicle in the event of a front, side, or rear collision, for example. By exchanging the registered information, traffic situations may be judged to activate appropriate deployment systems, for example.

Furthermore, an object detection system is known from German Published Patent Application No. 196 16 038, in which an optical transmitter for a light beam having an adjustable transmission angle and an angle-resolving optical receiver are provided. The light beam emitted is modulated here in such a way that the position of the object within the angular range of the light beam emitted may also be determined up to a specific distance from the phase difference of the transmitted light beam and the received light beam.

A sensor system for automatically determining the relative position between two objects is disclosed in German Published Patent Application No. 196 22 777. This conventional sensor system includes a combination of an angle-independent sensor and an angle-dependent sensor. The sensor which does not resolve the angle and is therefore angle-independent is implemented as a sensor which analyzes the distance to an object via a run-time measurement. Radar, lidar, or ultrasonic sensors are suggested as possible sensors.

The angle-dependent sensor includes a geometrical system of optical-electronic transmitters and receivers, which are positioned in the form of light barriers. The sensors, which both cover a joint detection region, are positioned closely next to one another. In order to determine a relative position to the object, the distance to the object is determined using the angle-independent sensor and the angle to the object is determined using the angle-resolving sensor.

The relative position to the object is known on the basis of the distance and angle to the object. As an alternative to the cited system of optical-electronic transmitters and receivers, a use of two sensors is suggested which jointly determine the angle to the object according to the triangulation principle.

A method and a device for object detection having at least two distance-resolving sensors attached to a motor vehicle, whose detection ranges at least partially overlap, is known from German Published Patent Application No. 199 49 409.

For this purpose, according to German Published Patent Application No. 199 49 409, means are provided in order to determine relative positions of possible detected objects in relation to the sensors in the overlap region according to the triangulation principle; possible illusory objects, which result from the object determination, may be determined through dynamic object observations.

Finally, an object detection system, in particular for a motor vehicle, is suggested in German Published Patent Application No. 100 11 263, the object detection system having multiple object detectors and/or modes of operation, using which different detection ranges and/or detection regions are registered.

For this purpose, according to German Published Patent Application No. 100 11 263, an object detector may be a radar sensor, which has a relatively large detection range with a relatively small angular range in a first mode of operation, and has a relatively small detection range in relation thereto, with an enlarged angular range, in a second mode of operation.

In addition, it is generally known per se that a distance measurement may be performed using a pulse radar, in which a carrier pulse having a square wave envelope of an electromagnetic oscillation is emitted in the gigahertz range.

This carrier pulse is reflected on the target object, and the target distance may be determined from the time span between the emission of the pulse and the incidence of the reflected radiation, and the relative speed of the target object may also be determined with restrictions by making use of the Doppler effect.

A pulse radar device of this type is known from German Published Patent Application No. 199 26 787. In this case, a transmit switch is switched on and off by the pulses of the generator, so that during the pulse duration a high-frequency wave generated by an oscillator and conducted via a fork to the transmission switch is switched through to the transmit antenna.

According to German Published Patent Application No. 199 26 787, a receive part also receives the output signal of the generator. The receive signal, i.e., a radar pulse reflected on an object, is mixed during a predefined time gate with the oscillator signal, which reaches a mixer via a receive switch, and analyzed.

U.S. Pat. No. 6,067,040 also describes a transmit switch, which is switched on and off by pulses of the generator. Separate channels are provided for in-phase/quadrature (I/Q) signals for receiving the reflected radar pulses.

As in the pulse radar device according to German Published Patent Application No. 199 26 787, the received signal is also mixed and analyzed only during a predefined time gate according to U.S. Pat. No. 6,067,040, for which a receive-side pulse modulator or pulse switch is located upstream from a power divider provided for dividing the local oscillator (LO) signals to the mixer in the receive-side I/Q (in-phase quadrature) branches.

This has the disadvantage, however, that no multi-receiver system may be implemented and no simultaneous analysis of multiple different receive cells is possible.

In contrast, in the suggestion according to German Published Patent Application No. 101 42 170, two separately controllable receive-side pulse modulators are provided; the continuous signal of the high-frequency source, which also controls the transmit-side pulse modulator, is switchable to one receive-side mixer via each of these modulators. This means that, in contrast to the suggestion according to U.S. Pat. No. 6,067,040, each mixer in a receive branch has the signal of the high-frequency source applied to it at different points in time and also may be connected to the signal of the high-frequency source for different lengths of time. In this way, different modes of operation are made possible, which are reversible in a relatively simple way.

A measuring principle based on the emission of pulses is also described, for example, in the textbook by Albrecht Ludloff, "Handbuch Radar und Radarsignalverarbeitung" ("Handbook of Radar and Radar Signal Processing"), pp. 2–21 to 2–44, Vieweg-Verlag, 1993. The textbook by Merrill Ivan Skolnik, "Introduction to Radar Systems," pp. 74 et seq., McGraw-Hill Publishing Company, may also be noted as further literature.

Typically, multiple radar sensors are necessary for the individual conflict situations in the surroundings of a motor vehicle to reliably activate the above-mentioned occupant protection systems in the motor vehicle; for example, a pre-crash recognition is necessary in order to allow prior registration of an object which represents a danger to the vehicle occupants in the event of a collision. In this way, it is to be possible to activate protective systems such as an airbag, belt tightener, or side airbag in a timely manner, in order to thus achieve the greatest possible protective effect.

The registration and/or monitoring of the traffic situation, in particular in proximity to the motor vehicle, may additionally be useful for multiple further applications. These include parking aids, aids for monitoring the "blind spot," and assistance in "stop and go" traffic, in which the distance to the vehicle traveling ahead is determined in order to be able to stop and go automatically.

For this purpose, multiple radar sensors, each having different requirements tailored to the measuring task, are typically used, the requirements essentially differing in the range and the analysis time, because each of these functions has specific registration ranges and different measuring cycle times; in principle, universal sensors may be operated jointly via a specially tailored bus system and connected together using an analysis unit; however, for reasons of performance, all distance ranges within a proximate range often may not be processed optimally in an analysis time which is relatively short for reliable functioning.

For these reasons, a device and a method for registering and analyzing objects in the surroundings of a motor vehicle is suggested in German Published Patent Application No. 199 63 005.

For this purpose, according to German Published Patent Application No. 199 63 005, the surroundings of the motor vehicle are registered by making use of a transmit signal of one pulse radar sensor at a time in one or more receive branches in such a way that different distance ranges are analyzed in parallel and/or sequentially; however, neither the device nor the method according to German Published Patent Application No. 199 63 005 is capable of also providing corresponding angle information in regard to the object to be detected.

Therefore, if radar sensors are used for registering the surroundings of the motor vehicle, the distance and the velocity of objects, such as other vehicles, are to be detected in the detection range of the radar sensor system. At close range, 24 gigahertz pulse radar sensors are used, for example, using which a Doppler analysis may be performed through a coherent receiver principle; this allows the velocity to be determined by analyzing the phase change over time (="Doppler effect").

Various more conventional methods for measuring velocities are known:

In range rating, the radial distance between the sensor and the object is measured in discrete time intervals of the scan cycle, typically ten milliseconds. The velocity to be measured results from the differential quotients of distance change and time interval.

However, range rating, i.e., position comparison from multiple scans in the interval of the cycle time, results in diverse problems:

At higher velocities of the object, restrictions to the unambiguity of the peak assignment may occur from scan to scan, because the distance change exceeds the width of the detection gate. In case of multiple moving objects in the detection space, this results in the radar reflections detected from the corresponding objects only being able to be assigned with difficulty.

Real objects exhibit strong fluctuation in their reflectivity. This is true in particular for quasi-optical reflection behavior in the microwave range, because the smallest changes in the angle of incidence of the reflection plane to the wavefront cause a strong change in the reflection cross section (RCS). The resulting change in the signal amplitude is distributed stochastically and may result in detection failures from scan to scan. The differential filter used must therefore process a high number of scans and thus has an undesirably high latency time.

The measurement of the velocity is imprecise because sequential measurements on the target object may find reflection centers having different radial distances; if multiple reflections on the object are superimposed into an overall reflection within the measuring gate, the phase offset of the individual reflections may change strongly from scan to scan, so that the focal point of the superimposed reflections shifts strongly. This results in measurement fuzziness.

In closing velocity (CV) measurement, the detection gate (range gate) is fixed at a defined radial distance having an envelope width of approximately twenty centimeters. An object traveling through this detection gate causes n phase angle rotations (n=16=20 centimeters divided by the wavelength $\lambda$). The phase change over time is the angular velocity and is proportional to the velocity of the object.

However, CV measurement also exhibits diverse problems:

During the CV measurement, the detection gate, whose width is approximately twenty centimeters and which is activated by the scan, is statically fixed at one position; during this measurement, the remaining detection region is not scanned. Therefore, other objects which may be functionally relevant are ignored.

As a result, it must be decided very reliably, through prior range rating in the normal scan operation, that a target is on a collision course in order to trigger the event transition into CV mode.

If it is a false triggering, the system must fall back into normal scan operation rapidly. Through this method, significant periods of time may arise in which there is no target detection.

If multiple objects having different velocities travel through the detection gate simultaneously, this generates a superposition of multiple Doppler frequencies, due to which simple frequency counting methods fail.

Because the convolution of the received signal using a detection gate is suspended during continuous wave (CW) measurement and instead of this there is continuous receiving operation, the Doppler frequencies of all moving objects in the range of the measuring sensitivity of the sensor system are measured simultaneously and without uniquely locating them.

However, CW measurement also exhibits diverse problems:

The measurement of the velocity is not location-specific and may therefore not be uniquely assigned to a specific object.

The Doppler frequencies of multiple objects are superimposed, so that simple frequency counting methods fail; instead of this, precise multifrequency-capable fast Fourier transforms (FFT) are used.

The measuring range is not delimited in a defined way, but rather is determined from antenna pattern, receiver sensitivity, and target size (RCS).

SUMMARY OF THE INVENTION

On the basis of the disadvantages, problems, and shortcomings of velocity measurement in range rating, CV operation, and CW operation described above and taking the outlined related art into consideration, the present invention is based on the object of refining a device of the above-mentioned type and a method of the above-mentioned type in such a way that an unambiguous target velocity measurement is ensured in continuous detection operation with a low latency time and resistance to fluctuations.

The teaching of the present invention is thus based on a device and a method for an unambiguous target velocity measurement by coherent radar, the radar architecture described operating according to the superheterodyne principle.

In other words, this means that the present invention suggests both an analysis method and the technical implementation in a superheterodyne radar architecture, whose integral component may be at least one superheterodyne receiver; this is a receiver having a constant signal conditioning frequency. By mixing multiple signals, at least one of which originates from a weak oscillator (transmitter) located within the device, a high selectivity becomes possible.

In this way, both the device according to the present invention and the method according to the present invention may be delimited from simple homodyne radars, which conventionally tap a part of the transmit signal before modulation in order to thus drive the receive mixer as a "local feed local oscillator (LO)". In this conventional approach, high frequency (HF) receiving signals are mixed down coherently in one step to the frequency offset zero (="zero InterFrequency (IF)".

However, direct mixing down of this type to zero-IF from the noise level is very unfavorable, because semiconductors have a 1/f noise which is very high in this frequency offset (from approximately 100 Hz to approximately 10 kHz); cross-talk signals from driver circuits are also dominant in this frequency range. The sensitivity of the homodyne approach is therefore low.

Furthermore, the device and method according to the teaching of the present invention are distinguished in that, in contrast to the CV measurement or CW measurement described according to the related art, the phase shift and therefore the velocity are analyzed in running scan operation. The detection gate is thus not stationary, but rather is displaced over the detection range over time.

The period of time which is available for analyzing a velocity-proportional phase shift is determined by how much the detection threshold is exceeded by targets or by objects, such as devices in the surroundings of a motor vehicle, pedestrians, parked motor vehicles, motor vehicles traveling ahead, or bicyclists. The receiver has at least one I/Q phase detector, which may represent the phase unambiguously over 360 degrees.

This period of time is inversely proportional to the scanning speed; thus, for example, at a scanning speed of two thousand meters per second and a width of the detection gate of twenty centimeters, a detection time of one hundred microseconds results=(twenty centimeters divided by two thousand meters per second).

This means that in this period of time of, for example, one hundred microseconds, a complete phase angle rotation of a Doppler frequency of a minimum of ten kilohertz (=100 $\mu s^{-1}$) may be represented. For an exemplary carrier frequency of 24.125 gigahertz, this Doppler frequency of ten kilohertz corresponds to a relative velocity of approximately 62 meters per second or approximately 225 kilometers per hour. It is clear that the time base available is sufficient to represent the complete period of relatively high velocities.

According to a special refinement of both the device and the method according to the present invention, the phase analysis may be performed by analyzing the phase of the I/Q mixer at the 50 percent marks of the radar signal and
at the peak of the radar signal.

The Doppler frequency results from the phase shift over these three measuring marks. It is assumed in the following that a minimum phase angle rotation of ninety degrees must occur over the measuring points in order to be able to make a statement about the velocity; therefore, the minimum speed $v_{min}$ is approximately 15.6 meters per second or approximately 56 kilometers per hour.

According to a particularly preferred embodiment of the present invention, it is suggested that the scanning speed be reduced after passing through the detection threshold, from two thousand meters per second to five hundred meters per second, for example.

In this way, the time base, i.e., the detection time, may be increased from one hundred microseconds to four hundred microseconds, so that the measuring range for the velocity has its lower limit extended downward by a factor of four (→minimum speed $v_{min}$=approximately 3.9 meters per second or approximately 14 kilometers per hour).

According to a preferred refinement of the present device and the present method, the in-phase (I) and quadrature (Q) channels is implemented by a case differentiation which is simple to implement:

The phase is correctly determined mathematically via the expression phi=arctan(I/Q). It is possible to implement the quotient I/Q and the arctan of this quotient only imprecisely and very computer-intensively using fixed-point microcontrollers. For this reason, it is expediently suggested that a simple case differentiation be applied, which quantifies the phase in steps of 45 degrees, for example.

This type of case differentiation is based on three simple comparison operations, from which the phase offset in the three measuring marks (=fifty percent mark of the rising edge of the radar signal; hundred percent mark of the radar signal; fifty percent mark of the falling edge of the radar signal) is determined.

| I > 0 | Q > 0 | \|I\| > \|Q\| | Range of phi in degrees |
|---|---|---|---|
| 0 (= no) | 0 (= no) | 0 (= no) | 225 to 270 |
| 0 (= no) | 0 (= no) | 1 (= yes) | 180 to 225 |
| 0 (= no) | 1 (= yes) | 0 (= no) | 90 to 135 |
| 0 (= no) | 1 (= yes) | 1 (= yes) | 135 to 180 |
| 1 (= yes) | 0 (= no) | 0 (= no) | 270 to 315 |
| 1 (= yes) | 0 (= no) | 1 (= yes) | 315 to 360 |
| 1 (= yes) | 1 (= yes) | 0 (= no) | 45 to 90 |
| 1 (= yes) | 1 (= yes) | 1 (= yes) | 0 to 45 |

A measurement uncertainty which is inversely proportional to the time base and proportional to the phase fuzziness results. For this reason, it is advantageous to select the time basis, i.e., the detection time, as long as possible.

Since the selection of a detection time which is as long as possible may be somewhat contrary to the requirement of the update rate of the detection cycle, according to a particularly advantageous refinement of the present invention, a change in the radar architecture is provided to resolve this contradiction by allowing two channels independent of one another to be implemented.

Expediently, the first channel (sig[nal] out, non-coherent) is used for the normal detection scan. For this purpose, the detection gate is displaced over the complete measuring range at a constant scanning speed.

The scan of the second channel (sig[nal] out, coherent) may preferably be operated independently from the first channel. The detection gate may thus be set to an arbitrary position for an arbitrary duration.

Through the method described above, an array of expedient embodiments, properties, features, and advantages, which are independent of one another or combinable with one another, result according to the present invention:

arbitrarily long measuring time in the second channel on an object for more precise determination of the velocity of the object;

the second channel may be used to determine the velocity using any measuring methods, for example:

using CW measurement with a fixed detection gate, using Doppler analysis with a slowly scanning detection gate, and/or using FFT; independent scan operation in the first channel—> no long blind or latency times (cf. problem description in this regard on CW measurement in the above "Background Information" section);

velocity is determined uniquely to the target in the detection gate of the second channel; the second measuring gate is positioned via the information of the radial time intervals of the first channel and via possible adjustment via the velocity measurement from the second channel;

the pulse operation may be optionally suppressed in the second channel, so that all velocity vectors of all objects in the detection range are determined non-uniquely to the targets (CW measurement); velocity discrimination may be achieved, for example, through a FFT;

by combining the location information from the first channel, the CW measurement, which is not unique to the target but is high-precision, from the second channel with computing-intensive FFT (with receive pulse operation suppressed), and finally the measurement of the velocities using phase case differentiation, which is computing-extensive, but provides unique locations, overall, target-unique, computing-intensive, precise object velocity information is achieved.

In summary, it may thus be stated that a feature of the present device and the present method is the possibility of performing location measurements (through a scan) and velocity measurements simultaneously therewith; therefore, a radar concept having simultaneous measurement of the velocity is implemented by the present invention.

Finally, the present invention relates to the use of at least one device of the above-mentioned type and/or a method of the above-mentioned type for object-unique measurement of the velocity of at least one object in the surroundings of a conveyance means, in particular in continuous registration and/or detection operation having a shorter latency time and having higher resistance to fluctuations.

In general, the present invention may be used in the field of vehicle surroundings sensor systems, thus, for example, for measuring and for determining the angle of at least one object, as is also relevant in the scope of pre-crash sensing in a motor vehicle.

For this purpose, it is determined by a sensor system whether there is a possibility of a collision with the detected object, for example, with another motor vehicle. If a collision occurs, it is additionally determined at what velocity and at what impact point the collision will occur.

With knowledge of this data, life-saving milliseconds may be gained for the driver of the motor vehicle, in which preparatory measures for the activation of the airbag or for a belt-tightener system may be performed, for example.

Further possible fields of use of the device according to the present invention and the method according to the present invention are parking assistance systems, blind spot detection, or a stop and go system as an expansion of an existing device for automatically regulating the vehicle velocity, such as an adaptive cruise control (ACC) system.

BRIEF DESCRIPTION OF THE DRAWING

The sole FIGURE in this application shows a schematic illustration of an exemplary embodiment of the device according to the present invention, which operates according to the method according to the present invention, in which a registration range and/or a detection gate is displaced at a scanning speed over a measuring range.

DETAILED DESCRIPTION

In the following, device 100 according to the present invention and a method related thereto for registering, detecting, and analyzing one or more (target) objects, such as devices in the surroundings of the motor vehicle, pedestrians, parked motor vehicles, motor vehicles traveling ahead, or bicyclists, is explained for exemplary purposes on the basis of FIG. 1.

Device 100 has a first oscillator unit 20, which is implemented in the form of a microwave oscillator unit and using which first oscillator signals (carrier frequency $F_{carrier}$) may be generated.

A transmit path or transmit branch 10, which contains, among other things, a transmit pulse switch unit 12, implemented as a pulse modulator, which has the first oscillator signals applied to it and by which pulse-modulated high-frequency signals are produced, is connected downstream from first oscillator 20.

These high-frequency signals produced by transmit pulse switch unit 12 are emitted by a transmit antenna 16, connected downstream from transmit pulse switch unit 12 and also positioned on transmit branch 10, and reflected on the object or target, which is to be detected simultaneously in regard to position (by a scan) and in regard to velocity.

To receive the signals reflected on the object or target, device 100 has a receive path or receive branch 50, connected downstream from first oscillator unit 20, in the form of a radio frequency (RF) receive branch. Correspondingly, a first divider unit 18 is connected downstream from first oscillator unit 20, using which the first oscillator signals produced by first oscillator unit 20 may be divided onto transmit branch 10 and receive branch 50.

Receive branch 50 contains, among other things, a receive antenna 30; first input terminal 34a of an I/Q mixing unit 34, which is also part of receive branch 50 and is connected downstream from receive antenna unit 30, has the signals received by this receive antenna unit 30 applied to it.

The signals reflected from the object or target are mixed with the first oscillator signals, which are applied to second input terminal 34b of I/Q mixing unit 34.

As may be inferred from the illustration in FIG. 1, device 100 also has a clock generator or trigger unit 80 (symbol "Tx"), which is implemented in the form of a low frequency (LF) clock generator unit and using which clock signals may be produced, which may be applied to both transmit pulse switch unit 12 and receive pulse switch units 52, 54, which are connected downstream from receive antenna unit 30 and also constitute receive branch 50.

In order to delay the clock signals, using which these switches 52, 54 are activated, in relation to the clock signals, using which transmit pulse switch unit 12 is activated, in a defined way, a pulse delay unit (="delay units" 22 and 24) is connected between clock generator or trigger unit 80 and each of receive pulse switch units 52 and 54, respectively.

According to the exemplary embodiment in FIG. 1, the signals received are analyzed and processed further using a receive circuit 70, which is implemented as a LF receive circuit. A property of this receive circuit 70 is that it is divided into two channels 72, 74, which are operable independently from one another, using a power divider unit 36 connected downstream from output terminal 34c of I/Q mixing unit 34.

In first channel 72 of receive circuit 70, the registration range and/or the detection gate is displaced over the entire measuring range at a constant scanning speed.

In contrast, in second channel 74 of receive circuit 70, the registration range and/or the detection gate is
  displaced over the measuring range at a variable, in particular reducible, scanning speed and
  placed at a predefinable position within the measuring range for a predefinable period of time at negligible scanning speed.

As may also be seen from the illustration according to FIG. 1, in first channel 72 of receive circuit 70, the signals received are demodulated using a demodulation unit 42 designed for amplitude modulation (AM). These demodulated received signals are applied to first input terminal 52a of first receive pulse switch unit 52.

Second input terminal 52b of first receive pulse switch unit 52 has the clock signals, produced using clock generator or trigger unit 80 and delayed in a defined way using first pulse delay component 22 (<--> first scan or "scan 1"), applied to it, after these clock signals have passed through a first pulse component 62, also connected in first channel 72 of receive circuit 70 between first pulse delay unit 22 and first receive pulse switch unit 52.

The analog signals are then converted at a relatively low sampling rate into digital signals in first channel 72 of receive circuit 70 using a first analog/digital (A/D) converter 82 connected downstream from first output terminal 52c of first receive pulse switch unit 52; these digital signals, which are systematized in particular in the form of complex-valued vectors or complex-valued scalars, are finally digitally processed using a (micro-) processor 90 connected downstream from first A/D converter unit 82.

In second channel 74 of receive circuit 70, the received analog signals coming from divider 36 are applied to first input terminal 60a of a second mixing unit 60, specifically an intermediate frequency mixer; second oscillator signals produced by a second oscillator unit 26, specifically an intermediate frequency oscillator, are applied to second input terminal 60b of second mixing unit 60.

Furthermore, as is obvious in FIG. 1, the signals coming from output terminal 60c of second mixing unit 60 are applied to first input terminal 54a of second receive pulse switch unit 54 in second channel 74 of receive circuit 70.

The clock signals, which are generated using clock generator or trigger unit 80 and delayed in a defined way using second pulse delay component 24 (<--> second scan or "scan 2") are applied to second input terminal 54b of second receive pulse switch unit 54, after these clock signals have passed through a second pulse component 64, also connected in second channel 74 of receive circuit 70 between second pulse delay unit 24 and second receive pulse switch unit 54.

The received analog broadband signals are then filtered and integrated into second channel 74 of receive circuit 70 using a low-pass (LP) filter unit 44, connected downstream from output terminal 54c of second receive pulse switch unit 54 and provided to narrow the bandwidth.

These low-pass filtered analog signals are converted at a relatively low sampling rate into digital signals using a second A/D converter 84 connected downstream from LP filter 44; these digital signals, which are systematized in particular in the form of complex-valued vectors or complex-valued scalars, are digitally processed using (micro-) processor unit 90, connected downstream from second A/D converter unit 84.

To elevate the detection range and the sensitivity of system 100,
  a transmit amplifier unit 14 for amplifying the high-frequency signals emitted is connected upstream from transmit antenna unit 16 and
  a receive amplifier unit 32, implemented as a pre-amplifier, is connected downstream from receive antenna unit 30 to amplify the signals received by receive antenna unit 30.

However, these two amplifiers 14, 32 are optional in that they do not necessarily contribute to the basic functionality of the present invention, i.e., in principle device 100 may also be operated without these two amplifier units 14, 32.

Furthermore, the Figure shows that a first mixing unit 38, which is implemented as an "upconverter", and a high-pass (HP) filter unit 40, provided to filter out the lower frequency sideband, are connected between first oscillator unit 20 and transmit pulse switch unit 12, especially between first divider unit 18 and transmit pulse switch unit 12.

First input terminal 38a of first mixing unit 38 is connected to first oscillator unit 20, specifically to first divider unit 18; second input terminal 38b of first mixing unit 38 is connected to second oscillator unit 26, specifically to second divider unit 28; output terminal 38c of first mixing unit 38 is connected to filter unit 40.

High-pass filter 40 is positioned in the superheterodyne system in transmit path 10, in order to filter out the lower sideband (otherwise AM); optionally, either a high-pass filter unit 40 (cf. FIG. 1) or a low-pass filter unit 40 may be used at this point of transmit path 10 in order to filter out one of the sidebands, specifically the lower frequency sideband if a high-pass filter 40 is used or the upper frequency sideband if a low-pass filter 40 is used.

A further independent feature thus results from this principle, inasmuch as the superheterodyne principle allows the "internal" operation of device 100 at a specific frequency. However, the output is emitted in a frequency band independent thereof with the aid of filter unit 40.

As a result, this advantageously means that using present device 100 and using the present method for operating present device 100:

the use of more favorable components for the "internal" fundamental frequency is possible and by introducing filter unit 40, frequency bands may be "searched out flexibly" and therefore the approval capability of system 100 may be achieved.

In summary, it may thus be established in regard to the function and the active principle of device 100 that the coherent heterodyne approach of the present invention, for the above-mentioned reasons, mixes down the HF receive signal ("HF-RX") using I/Q downconverter 34 and using IF mixer 60 to an intermediate frequency (IF or $F_{intermediate}$, 2 GHz or 2.5 GHz, for example), which is higher than 0, in a first step.

The 1/f noise (="flicker noise", which may be attributed to multiple noise causes and is characterized by a spectral distribution having a decay which is reciprocally proportional to the frequency) has dropped in this intermediate frequency below the unavoidable kT noises (product kT=noise output available per Hertz of bandwidth from a resistor in thermal equilibrium).

In order to obtain coherence, i.e., in order to ensure the relationship of the phase between transmit signal and mixed-down video signals (=necessary requirement for Doppler analysis of velocities), the transmit signal is also mixed up with the intermediate frequency carrier in transmit path or branch 10.

For this reason, intermediate frequency oscillator 26 is mixed up to the final transmit frequency of 26 GHz in transmit path 10 by upconverter 38 with the signal of HF oscillator 20 ("stalo", stable local oscillator, e.g., 24 GHz).

In this mixing procedure, in principle an upper sideband (USB) and a lower sideband (LSB) always arise, i.e., a spectral line at 22 GHz and a spectral line at 26 GHz, only the latter being desirable as the transmit signal, however.

For this reason, upconverter 38 is followed by high-pass filter 40, which suppresses the lower sideband, i.e., the component at 22 GHz. The output signal of high-pass filter 40 may now be modulated using transmit pulse modulator unit 12, amplified using transmit amplifier unit 14, and fed to transmit antenna 16.

The receive signal at 26 GHz is mixed down to IF offset in mixer 34 with stalo 20; for this purpose, the signal is amplified to IF offset using receiver pre-amplifier 32, for example, in order to raise it significantly over the noise level; the signal is then divided using HF divider 36, two possibilities for detection then result in principle according to the teaching of the present invention:

In the upper channel or path 74 of receive circuit 70 in FIG. 1, the signal is mixed down coherently via mixer 60 ($F_{IF}$=2.5 GHz) to zero IF, from which the output signal "sigout (coherent)" (<--> FVID-NKD=DC . . . f" between IF mixing unit 60 and second receive pulse switch unit 54) results.

In lower channel or path 72 of receive circuit 70 in FIG. 1, the envelope is extracted non-coherently by envelope demodulation produced by AM demodulation unit 42 ($F_{IF}$=2.5 GHz) at a rectifying diode plus holding capacity, for example, from which the output signal "sigout (non-coherent)" (<--> FVID-NKD=DC . . . f" between first receive pulse switch unit 52 and first A/D converter 82) results.

Conventional homodyne radars known from the related art have placed the receive switch in the LO feed of the homodyne mixer, which is therefore operated by sampling.

The procedure of mixing down and sampling is thus implemented in one physical block. The mixer operated by sampling is comparable to a source whose internal resistance varies from low (for example 200 ohms) to high with or without feed, similar to the switch of a sample & hold (S & H) element.

According to the device and method of the present invention, it is possible according to the present invention to separate the procedure of mixing down from the procedure of sampling. The option thus results of operating samplers independently from one another, i.e., operating velocity measurement (closing velocity (CV) measurement) and location measurement at the same time as scanning.

What is claimed is:

1. A device for at least one of registering, detecting, and analyzing at least one object, in which at least one of a registration range and a detection gate is displaceable at a scanning speed over a measuring range, the device comprising:

at least one first oscillator unit including a microwave oscillator unit and for producing first oscillator signals;

one of at least one transmit path and at least one transmit branch, connected downstream from the at least one first oscillator unit, the one of the at least one transmit path and the at least one transmit branch including:

at least one transmit pulse switch unit including a pulse modulator and to which the first oscillator signals can be applied, the at least one transmit pulse switch producing pulse-modulated high-frequency signals, and at least one transmit antenna unit, connected downstream from the at least one transmit pulse switch unit, for emitting the high-frequency signals produced by the at least one transmit pulse switch unit;

one of at least one receive path and at least one receive branch including one of an RF receive path and an RF receive branch, the one of the at least one receive path and the at least one receive branch connected down stream from the at least one first oscillator unit and including:
  at least one receive antenna unit for receiving signals reflected at the at least one object,
  at least one I/Q mixing unit, connected downstream from the at least one receive antenna unit, for mixing signals received by the at least one receive antenna unit with the first oscillator signals, the signals received by the at least one receive antenna unit capable of being applied to a first input terminal of the at least one I/Q mixing unit, and the first oscillator signals being capable of being applied to a second input terminal of the at least one I/Q mixing unit,
  at least one receive pulse switch unit connected downstream from the at least one receive antenna unit;
one of at least one clock generator and at least one trigger unit corresponding to an LF clock generator unit and for producing clock signals, the clock signals capable of being applied to the at least one transmit pulse switch unit and the at least one receive pulse switch unit;
at least one pulse delay unit, connected between the at least one receive pulse switch unit and the one of the at least one clock generator and the at least one trigger unit, for delaying, in a defined way, the clock signals, the clock signals being capable of activating the at least one receive pulse switch unit and the at least one transmit pulse switch unit;
at least one receive circuit including a LF receive circuit and for performing analysis and further processing of signals received;
at least one power divider unit connected downstream from an output terminal of the I/Q mixing unit, wherein:
  the at least one receive circuit is divided into at least a first channel and a second channel that are operable separately from one another, using the at least one power divider unit,
  the first channel is for displacing at least one of the registration range and the detection gate at a constant scanning speed over an entirety of the measuring range, and
  the second channel is for at least one of:
    displacing at least one of the registration range and the detection gate at a variable corresponding to a reducible scanning speed over the measuring range, and
    setting at least one of the registration range and the detection gate at a predefinable position within the measuring range for a predefinable period of time at a negligible scanning speed.

2. The device as recited in claim 1, wherein:
the device corresponds to a pulse radar device.

3. The device as recited in claim 1, further comprising:
at least one first divider unit for distributing the first oscillator signals to the one of the at least one transmit path and the at least one transmit branch and to the one of the at least one receive path and the at least one receive branch, the at least one first divider unit being connected downstream from the at least one first oscillator unit.

4. The device as recited in claim 1, further comprising at least one of:
at least one transmit amplifier unit for amplifying the high-frequency signals in order to increase at least one of a detection range and a sensitivity of the device, the at least one transmit amplifier unit being connected upstream from the at least one transmit antenna unit; and
at least one receive amplifier unit including a pre-amplifier for amplifying signals received by the at least one receive antenna unit, the at least one receive amplifier being connected downstream from the at least one receive antenna unit.

5. The device as recited in claim 1, further comprising:
a first pulse delay unit;
a second pulse delay unit;
at least one processor unit including a microprocessor unit;
at least one first pulse component;
at least one second pulse component;
at least one first A/D converter unit for converting analog signals at a relatively low sampling rate into digital signals
at least one second A/D converter unit for converting low-pass filtered analog signals into digital signals at a relatively low sampling rate;
at least one second mixing unit including an IF mixing unit;
at least one second oscillator unit including an IF oscillator unit;
at least one low-pass filter unit for at least one of filtering and integrating analog broadband signals, the at least one low-pass filter narrowing a bandwidth of the analog broadband signals, wherein:
the first channel of the at least one receive circuit includes at least one demodulation unit corresponding to at least one AM demodulator,
a first input terminal of a first receive pulse switch unit of the at least one receive pulse switch unit is capable of having the received signals applied thereto, the received signals being able to be demodulated by the at least one demodulation unit,
a second input terminal of the first receive pulse switch unit is capable of having the clock signals applied thereto,
the clock signals are produced by the one of the at least one clock generator and the at least one trigger unit,
the clock signals are delayed in a defined way by the first pulse delay unit,
the clock signals pass through the at least one first pulse component, the at least one first pulse component being connected between the first pulse delay unit and the the first receive pulse switch unit,
an output terminal of the first receive pulse switch unit is connected upstream from the at least one first A/D converter unit,
the at least one processor unit is connected downstream from the at least one first A/D converter unit and is for digital processing of the digital signals,
the digital signals are systematized in the form of one of complex-valued vectors and complex-valued scalars,
the second channel is connected to an output terminal of the at least one second mixing unit,
a first input terminal of the at least one second mixing unit is able to have the received analog signals coming from the at least one power divider unit applied thereto,
a second input terminal of the at least one second mixing unit is able to have second oscillator signals produced by the at least one second oscillator unit applied thereto,
a first input terminal of a second receive pulse switch unit of the at least one receive pulse switch unit is capable of having signals coming from the output terminal of the at least one second mixing unit applied thereto,
a second input terminal of the second receive pulse switch unit is capable of having the clock signals applied thereto,
the clock signals are delayed in a defined way by the second pulse delay unit,
the clock signals pass through the at least one second pulse component, the at least one second pulse component being connected between the second pulse delay unit and the second receive pulse switch unit, and
an output terminal of the second receive pulse switch unit is connected upstream from the at least one low-pass filter unit.

6. The device as recited in claim 3, further comprising:
at least one second mixing unit including one of an upconverter and a downconverter;
at least one filter unit for filtering out at least one sideband and including at least one high-pass filter unit for filtering out a lower frequency sideband; and
at least one low-pass filter unit for filtering out an upper frequency sideband, wherein:
the at least one second mixing unit, the at least one filter unit, and the at least one low-pass filter unit are connected between the at least one first oscillator unit and the at least one transmit pulse switch unit and between the at least one first divider unit and the at least one transmit pulse switch unit, wherein:
a first input terminal of the at least one second mixing unit is connected to the at least one first oscillator unit and to the at least one first divider unit,
a second input terminal of the at least one second mixing unit is connected to the at least one second oscillator unit and to a second divider unit, and
an output terminal of the at least one second mixing unit is connected to the at least one filter unit for filtering out at least one sideband.

7. A method for at least one of registering, detecting, and analyzing at least one object, in which at least one of a registration range and a detection gate is displaced at a scanning speed over a measuring range, comprising:
generating first oscillator signals using at least one first oscillator unit including a microwave oscillator unit;
generating pulse-modulated high-frequency signals using at least one transmit pulse switch unit to which the first oscillator signals are applied thereto;
emitting the high-frequency signals using at least one transmit antenna unit connected downstream from the at least one transmit pulse switch unit;
receiving signals reflected on the at least one object using at least one receive antenna unit;
mixing the signals received by the receive antenna unit, which are applied to a first input terminal of at least one I/Q mixing unit connected downstream from the at least one receive antenna unit, with the first oscillator signals, which are applied to a second input terminal of the at least one I/Q mixing unit, using the at least one I/Q mixing unit;
generating clock signals, which are applied to both the at least one transmit pulse switch unit and at least one receive pulse switch unit connected downstream from the at least one receive antenna unit, using one of at least one clock generator and at least one trigger unit including a LF clock generator unit;
delaying the clock signals, using which the at least one receive pulse switch unit is activated, in a defined way in relation to the clock signals, using which the at least one transmit pulse switch unit is activated, using at least one pulse delay unit connected between the at least one receive pulse switch unit and the one of the at least one clock generator and the at least one trigger unit;
analyzing and further processing the signals received using at least one receive circuit including a LF receive circuit, wherein:
the at least one receive circuit is divided using at least one power divider unit connected downstream from an output terminal of the at least one I/Q mixing unit into at least two channels including a first channel and a second channel, which are operated independently from one another,
at least one of the registration range and the detection gate is displaced at a constant scanning speed over an entirety of the measuring range in the first channel and in the second channel of the receive circuit,
at least one of the registration range and the detection gate is at least one of displaced at a variable, reducible scanning speed over the measuring range and set for a predefined period of time and negligible scanning speed at a predefined position within the measuring range.

8. The method as recited in claim 7, wherein:
in the first channel the received signals are demodulated using at least one demodulation unit including at least one AM demodulator,
the demodulated received signals are applied to the first input terminal of the at least one first receive pulse switch unit,
the clock signals are delayed in a defined way using the at least one first pulse delay unit,
the clock signals pass through at least one first pulse component connected between the at least one first pulse delay unit and the at least one first receive pulse switch unit,
the clock signals are applied to the second input terminal of the at least one first receive pulse switch unit,
the analog signals are converted at a relatively low sampling rate into digital signals using at least one first A/D converter unit connected downstream from the output terminal of the at least one first receive pulse switch unit,
the digital signals, which are systematized in particular in the form of complex-valued vectors or complex-valued scalars, are digitally processed using at least one processor unit including a microprocessor unit, connected downstream from the first A/D converter unit,
in the second channel of the at least one receive circuit the received analog signals coming from the power divider unit are applied to a first input terminal of at least one second mixing unit including an IF mixing unit,
second oscillator signals, generated by at least one second oscillator unit including an IF oscillator unit, are applied to a second input terminal of the at least one second mixing unit,
the signals coming from an output terminal of the at least one second mixing unit are applied to the first input terminal of the at least one second receive pulse switch unit,
the clock signals are delayed in a defined way using the at least one second pulse delay unit,
the clock signals pass through at least one second pulse component connected between the at least one second pulse delay unit and the at least one second receive pulse switch unit, the clock signals are applied to the second input terminal of the at least one second receive pulse switch unit, the received analog broadband signals are at least one of filtered and integrated to narrow the bandwidth, using at least one low-pass filter unit, connected downstream from the output terminal of the at least one second receive pulse switch unit, the low-pass filtered analog signals are converted at a relatively low sampling rate into digital signals using at least one second A/D converter unit connected downstream from the at least one low-pass filter unit, and the digital signals, which are systematized in particular in the form of one of complex-valued vectors and complex-valued scalars, are digitally processed using the at least one processor unit connected downstream from the at least one second A/D converter unit.

9. The method as recited in claim 7, wherein at least one of:

in the second channel, a Doppler measurement and analysis having at least one of the registration range and the detection gate displaced at a slow scanning speed over the measuring range is used, a CV measurement and analysis having at least one of the registration range and the detection gate fixed at a predefined position within the measuring range is used, an FFT measurement and analysis is used, any other arbitrary measurement and analysis method is used, a pulse operation is suppressed, so that all velocity vectors of all objects in the at least one of the registration range and the detection gate are determined using a CW measurement in a way which is not unique to objects, and a velocity discrimination is achieved through FFT.

10. The method as recited in claim 7, wherein:

the method implemented in a device is performed on the basis of the superheterodyne principle at a specific frequency is made possible, the output, when emitting the high-frequency signals generated by the at least one transmit pulse switch unit, is emitted in a frequency band independent of an internal operation of the device, using the filter unit provided for filtering out at least one sideband and connected between the first oscillator unit and the transmit pulse switch unit and between the first divider unit and the transmit pulse switch unit, a high-pass filter unit provided for filtering out the lower frequency sideband and a low-pass filter unit provided for filtering out the upper frequency sideband.

11. The method as recited in claim 7, wherein:

the method is used for object-unique measurement of the velocity of the at least one object in the surroundings of a conveyance means, in a continuous registration and detection operation having low latency time and having high resistance to fluctuations.

* * * * *